United States Patent Office 3,245,941
Patented Apr. 12, 1966

3,245,941
POLYURETHANES FROM POLYISOCYANATES AND COPOLYMERS OF HYDROXYALKYL ACRYLATES, ALKYL ACRYLATES, AND VINYL BENZENES
Rudi Mayer, Leverkusen-Mathildenhof, Gunter Kolb, Cologne-Stammheim, and Otto Bayer and Hermann Gruber, Leverkusen, Germany, assignors to Farbenfabriken Bayer Aktiengesellschaft, Leverkusen, Germany, a German corporation
No Drawing. Filed Mar. 20, 1963, Ser. No. 266,482
Claims priority, application Germany, Mar. 24, 1962,
F 36,372
4 Claims. (Cl. 260—31.6)

This invention relates to polyurethane polymers and, more particularly, to alkali resistant polyurethane polymers based on hydroxy alkyl esters of acrylic and methacrylic acid.

The preparation of solid polyurethane polymers and particularly those which are useful as coating compositions is well known. The coating compositions heretofore known are prepared by reacting an organic polyisocyanate with an active hydrogen-containing compound in an inert organic solvent therefor. The coatings are applied to substrates, including metal, wood, and the like, by any suitable method, including brushing, spraying, dipping, and the like, and then the solvent evaporates and leaves a deposit of polyurethane polymer on the substrate, which has highly advantageous properties. One system, in particular, has been proposed heretofore in U.S. Patent 3,028,367, wherein a low molecular weight copolymer of a hydroxy alkyl acrylate or methacrylate is reacted in the presence of a free radical liberating agent as catalyst and an organic thiol compound which serves as a molecular weight regulator. These sulfur-containing copolymers yield coatings on reaction with an organic polyisocyanate which have good resistance to solvents and acids, but, in most cases, their resistance to alkali is insufficient.

It is, therefore, an object of this invention to provide improved polyurethane polymers based on hydroxy alkyl acrylates and methacrylates which have improved resistance to alkali. Another object of this invention is to provide an improved method of rendering substrates resistant to alkali. A further object of this invention is to provide polyurethane coating compositions which, when deposited on a substrate, lead to the formation of coatings having excellent luster, high elasticity, good electrical properties, good resistance to acids and solvents, and, in addition, superb resistance to alkalis.

The foregoing objects and others which will become apparent from the following description are accomplished in accordance with the invention, generally speaking, by providing polyurethane polymers obtained by reacting an organic polyisocyanate with a sulfur-free copolymer of a hydroxy alkyl acrylate or methacrylate with an aromatic vinyl compound and a member selected from the group of alkyl acrylate and alkyl methacrylate. Therefore, the present invention contemplates coating compositions which are inert organic solvent solutions of polyurethane polymers obtained by a process which comprises reacting an organic polyisocyanate with the sulfur-free copolymers obtained from hydroxy alkyl acrylate with an aromatic vinyl compound and a member selected from the group of alkyl acrylate and alkyl methacrylate. It is, moreover, possible to prepare polyhydroxyl copolymers in accordance with the method of the present invention which are free of sulfur by reacting hydroxy alkyl acrylates or methacrylates with aromatic compounds which contain an ethylenically unsaturated side chain and with alkyl acrylates or methacrylates.

Any suitable hydroxyl alkyl acrylate or methacrylate may be used, but it is preferred to use those hydroxy alkyl acrylates and methacrylates where the alkyl group contains from 2 to 12 carbon atoms. The hydroxy alkyl acrylates and methacrylates which are contemplated for polymerization in the absence of sulfur-containing compounds to prepare the hydroxy-bearing copolymers of the invention may be represented by the following formula:

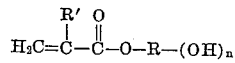

wherein R is an alkylene radical having 2 to 12 carbon atoms which may be substituted with other atoms, including halogens, such as, chlorine, bromine, iodine, and the like. R' is either hydrogen or methyl depending on whether the fundamental acid is acrylic acid or methacrylic acid, and $n$ is an integer of 1 to 3. Specific examples of R in the foregoing formula are ethylene, 1,2-propylene, 1,3-propylene, 1,4-butylene, 1,3-butylene, 1,5-pentylene, 1,6-hexylene, 2,6-hexylene, 1,7-heptylene, 1,8-octylene, 1,9-nonylene, 1,10-decylene, 1,12-dodecylene, and the like. Thus, specific compounds are beta-hydroxy ethyl acrylate, beta-hydroxy propyl acrylate, gamma-hydroxy propyl acrylate, beta-hydroxy ethyl methacrylate, beta-hydroxy propyl methacrylate, gamma-hydroxy propyl methacrylate, beta-hydroxy butyl acrylate, beta-hydroxy butyl methacrylate, 4-hydroxy butyl acrylate, beta-hydroxy pentyl acrylate, beta-hydroxy pentyl methacrylate, the mono ester of glycerin and methacrylic acid, the mono ester of trimethylol propane and acrylic acid, the mono ester of trimethylol propane and methacrylic acid, beta-hydroxy - gamma - chloropropyl acrylate, beta - hydroxy gamma-chloro propyl methacrylate, beta-hydroxy-alpha-chloro ethyl methacrylate, beta-hydroxy-gamma-bromo butyl acrylate, 5-hydroxy-3-idodo pentyl acrylate, 6-hydroxy hexyl acrylate, 7-hydroxy heptyl methacrylate, 6-hydroxy octyl acrylate, 5-hydroxy decyl methacrylate, and the like.

As stated above, these esters of acrylic and methacrylic acid which contain hydroxyl groups are copolymerised with aromatic compounds containing an ethylenically unsaturated side chain. Compounds of this type are, for example, styrene, vinyl toluylene, alpha-methyl styrene, para-chloro styrene, and the like.

The third component to be copolymerised with the hydroxyl esters of acrylic and methacrylic acid and with the aromatic compound containing an ethylenically unsaturated side chain are hydroxyl-free esters of acrylic and methacrylic acid. To be mentioned as examples are the methyl, ethyl, isopropyl, butyl, octyl and dodecyl esters of acrylic acid and methacrylic acid.

The polymerization of the monomeric starting material is preferably carried out in an inert organic solvent, such as, the aromatic solvents, esters, or ether esters, including, for example, benzene, toluene, xylene, ethylene glycol diacetate, the diacetate of diethylene glycol, and the like, in the presence of free radical forming catalysts of the peroxide type, such as, benzoyl peroxide, lauroyl peroxide, ditertiary butyl peroxide, cumene hydroperoxide, and the like, or the azo type, such as, azoisobutyric acid dinitrile. Conventional polymerization temperatures are used, preferably in the range of from about 50° C. to about 150° C. The reaction is carried out to the point that the polymers have molecular weights of from preferably about 5,000 to about 100,000. It is preferred also that the hydroxyl content be within the range of from about 0.1% to about 10% and the acid number below about 5, most preferably below about 2. Still further in the production of the hydroxyl-bearing copolymers, a sulfur-free compound, such as, a chlorinated hydrocarbon or a suitable unsaturated compound, may be used as a molecular weight regulator. It is essential to the invention that none of the heretofore known sulfur-containing molecular weight regulators are used, since these lead to polyurethane polymers on reaction with organic polyisocyanates which have unsatisfactory resistance to alkali. Suitable molecular weight regulators to be used in accordance with the present invention are orthodichloro benzene, chloro benzene, para-chloro toluene, cyclohexene, vinyl cyclohexene, and the like. It is strongly preferred to have the hydroxyl content between about 0.1% and about 10% and even more preferred to have it fall in the range of from about 2% to about 10% by weight based on the weight of the whole polymer. The reaction of the sulfur-free copolymers with organic polisocyanates can be carried out with an excess, a deficiency, or a stoichiometric amount. It is preferred to have a slight excess of organic polyisocynate for the preparation of the coating compositions of the invention.

Any suitable organic polyisocyanate may be used, including aliphatic, cycloaliphatic, alkaryl, aralkyl, heterocyclic and aryl polyisocyanates, such as, for example, diisocyanates, and particularly there may be used tetramethylene diisocyanate, pentamethylene diisocyanate, octamethylene diisocyanate, dodecamethylene diisocyanate, 3, 3'-diisocyanato dipropyl ether, xylylene diisocyanates, para, para'-diphenylmethane diisocyanate, beta, beta'-diphenyl propane-4,4'-diisocyanate, and the like. Other examples are meta-phenylene diisocyanate, para-phenylene diisocyanate, 1-methyl phenylene-2,4-diisocyanate, naphthylene-1,4 - diisocyanate, naphthylene-1,5 - diisocyanate, 2,6-toluylene diisocyanate, 1,3,5-benzene triisocyanate, para, para', para''-triphenylmethane triisocyanate, and the like. Also, the addition products of polyisocyanates with a deficient quantity of a low molecular weight alcohol, such as, 1,4-butane diol, glycerine, trimethylolpropane, the hexane diols and hexane triols and addition products of the aforementioned polyisocyanates, with low molecular weight polyesters, such as castor oil, may also be used. Also suitable are the isocyanate polymers described in German specifications Nos. 1,022,789 and 1,027,394. Mixtures of organic isocyanates may also be employed.

One may also use biuret polyisocyanates of the general formula:

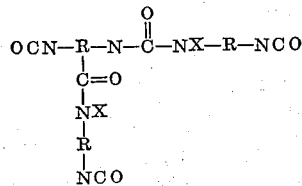

in which R is an aliphatic, hydroaromatic, araliphatic including aralkyl or an aromatic radical, which may or may not be substituted with halogen, such as, chlorine, NO₂, an alkyl radical such as methyl, ethyl; an alkoxy radical, methoxy, ethoxy or the like. R should not contain any hydrogen atoms which are reactive with an —NCO group. X is either hydrogen or the grouping —CO—NX—R—NCO in which X has the same meaning. The polyisocyanates having the biuret structure may be prepared by reacting in a neutral solution water with a monomeric organic diisocyanate in the ratio of 1 mol water to 3 mols diisocyanate or by reacting a monomeric organic diisocyanate with urea diisocyanate of the formula:

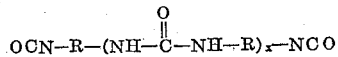

in which R is an aliphatic, hydroaromatic, araliphatic or an aromatic radical, which may or may not be substituted with halogen, such as, chlorine, an NO₂ group, an alkyl radical, such as methyl, ethyl; an alkoxy radical, such as methoxy, ethoxy or the like, and $x$ is from 1 to 5.

Any suitable crude isocyanate may be used, such as, for example, crude toluylene diisocyanates obtained by the phosgenation of a mixture of toluylene diamines or crude diphenyl methane isocyanates obtained by the phosgenation of crude diphenyl methane diamine. Crude diphenyl methane diamine is the reaction product of aniline and formaldehyde in the presence of HCl and contains some tri- and higher polyamines. A preferred unrefined or crude isocyanate is one having from about 26 to about 33 percent free —NCO and an amine equivalent of about 120 to about 150, such as, for example, a product having about 32 percent free —NCO and an amine equivalent of about 140. A specific crude isocyanate suitable for use in accordance with the present invention may be obtained by reacting about 60 parts of aniline with about 25 parts of formaldehyde (37 percent aqueous) and about 74 parts of HCl (30 percent aqueous) at a temperature of about 90° C. to about 100° C. for about 1.5 to about 2 hours and then reacting this product with NaOH and separating out the crude amine. About 100 parts of phosgene are then reacted with the crude amine until a product having an amine equivalent of about 135 and containing about 31 percent free —NCO is obtained. The free excess phosgene and substantially all of the solvents used, if any, are then removed. When toluylene diisocyanates, for example, are produced by conventional phosgenation of the corresponding diamines, a product containing about 90 percent 2,4- and 2,6-toluylene diisocyanate and the balance a crude residue of imidazoles and the like resulting in the phosgenation is obtained from the phosgenator. This product may also be used. It is preferred to phosgenate a mixture of ortho- and paratoluylene diamines. A specific product is the undistilled reaction mixture obtained by the phosgenation of 80 percent 2,4- and 20 percent 2,6-toluene diamine containing 90 percent of a mixture of about 80 percent 2,4- and 20 percent 2,6-toluylene diisocyanates and the balance polymers incapable of accurate analysis.

The commercially available crude 4,4'-diphenyl methane diisocyanate having an assay of 90 percent maximum, an amine equivalent of 141 maximum, about 0.04 to about 0.4 percent by weight hydrolyzable chloride, about 0.1 to about 0.6 percent by weight total chloride and having a flash point of about 430° F. may be used. As pointed out above, when toluylene diisocyanate, for example, is produced by conventional phosgenation of the corresponding diamine, a product containing about 90 percent 2,4- and 2,6-toluylene diisocyanate is obtained from the phosgenator. Of course, the product from the phosgenator is subjected to distillation to remove the solvent so that a product having 90 percent of 2,4- and 2,6-toluylene diisocyanate is obtained. The initial product from the phosgenator in most cases contains about 80 percent by weight of solvent. The 2,4- and 2,6-toluylene diisocyanate may be mixed with any suitable amount of the residue obtained if the isocyanate is refined and then reconstituted. In this event, it is preferred to have at least 50 percent of the refined isocyanate present. The crude polyisocyanates disclosed in U.S. Patent 2,950,307 are suitable.

Any suitable inert organic solvent may be used to deposit the coating composition on a substrate, including benzene, toluene, xylene, the diethyl ether of diethylene glycol, ethylene glycol diacetate, butylene glycol diacetate, methylene chloride, carbon tetrachloride, and the like.

The coating compositions of the invention are suitable for coating various substrates, including wood, metals, such as, steel, aluminum, tin, and the like, and may, if desired, be combined with various auxiliary substances, including additional low molecular weight chain extenders, such as, ethylene glycol, 1,4-butane diol, amino alcohols, such as, ethanol amine, diamines, such as, ethylene diamine, and the like. Also, pigments, such as, carbon black, titanium dioxide, iron oxide, zinc oxide, chrome green; dyestuffs, such as, menthol blue, lithol red, and the like, may be incorporated into the coatings. The coatings may also be applied with substances which are capable of splitting off isocyanate at elevated temperatures, such as those disclosed in U.S. Patent 2,952,665. Flow assisting agents may be added also, such as polydimethyl siloxane having a viscosity of about 2,000 cps. at 25° C.

In order to accelerate the reaction, if desired, known catalysts for the isocyanate hydroxyl reaction may be used, such as, tertiary amines, including triethylene diamine, N-methyl morpholine, N-ethyl morpholine, N-coco morpholine, hexahydrodimethyl aniline, and organo-metallic compounds, such as those disclosed in U.S. Patent 2,846,408. The preferred organo-metallic compounds are the tin compounds, including dibutyl tin di-2-ethylhexoate, dibutyl tin dilaurate, stannous octoate, stannous oleate, and the like.

It is preferred that the organic solvent solutions have a solids content of from about 20% to about 80% in order to be satisfactorily applied with subsequent evaporation of the solvent. The coating compositions of the invention are surprisingly resistant to both strong inorganic acids and also to hot strong caustic solutions. In addition, the coatings have excellent resistance to weathering and yellowing. Further, they may be used in conjunction with heretofore known hydroxyl polyesters, such as those obtained from polycarboxylic acids and polyhydric alcohols, for example, ethylene glycol and adipic acid or polyhydric polyalkylene ethers, such as, polypropylene ether glycol having a molecular weight of about 2,000, and the like.

The invention is further illustrated by the following examples in which parts are by weight unless otherwise indicated.

EXAMPLE 1

*Production of the starting material*

(a) About 150 parts of ethyl glycol diacetate, about 150 parts of xylene and about 3 parts of lauroyl peroxide are mixed and heated to boiling point while constantly passing nitrogen through. A mixture of about 100 parts of styrene, about 45 parts of hydroxypropyl methacrylate and about 45 parts of butyl acrylate is then added dropwise over a period of several hours and the mixture is stirred for about 20 to 30 hours at about 130° C. until the yield is about 100%. In this way, a viscous and almost colorless solution is obtained.

(b) About 290 parts of the approximately 35% solution obtained as starting material are mixed with about 70 parts of a solution of about 750 parts of a reaction product of 1 mol of trimethylol propane and 3 mols of a mixture 80% 2,4- and 20% 2,6-toluylene diisocyanate (—NCO content 17.3%) in about 250 parts of ethyl acetate.

A clear solution is obtained, which after an initial reaction time of about 15 minutes is processed in the usual way by brushing, spraying or casting. The standing time of the mixture is about 15 hours. The result is highly lustrous, colorless coated films having the following properties:

Drying time _____minutes__ 135
Pendulum hardness according to Albert König (DIN 53,157):
    After 1 day _____sec__ 60
    After 4 days _____sec__ 93
    After 10 days _____sec__ 118
Erichsen-depression (DIN 53,156) _____mm__ 8.2

After being treated for about 21 days with approximately 10% caustic potash solution or approximately 10% sulphuric acid at about 80° C., the films show no change, not even after being treated for about 21 days in a weatherometer.

EXAMPLE 2

*Production of the starting material*

(a) About 100 parts of ethyl glycol diacetate, about 150 parts of carbon tetrachloride and about 10 parts of cumene hydroperoxide are heated under nitrogen to about 80° C. and a mixture of about 76 parts of hydroxypropyl methacrylate, about 44 parts of butyl acrylate and about 80 parts of styrene is slowly added thereto.

(b) About 200 parts of the polymer solution obtained as starting material and brought to approximately 60% by weight of solids are diluted with about 190 parts of a mixture of equal parts of ethyl acetate, toluene, butyl acetate and ethyl glycol diacetate. About 0.45 part of hexahydro-N,N-dimethyl-aniline is added and the mixture is reacted with about 106 parts of a solution of about 750 parts of a reaction product of 1 mol of trimethylol propane and 3 mols of toluylene diisocyanate (—NCO content 17.3%) of Example 1(b) in 250 parts of ethyl acetate. After a preliminary reaction time of about 10 minutes, the lacquer mixture is applied to a support and coating films are obtained which have the following properties:

Drying time _____minutes__ 95
Pendulum hardness according to Albert König (DIN 53,157) after 10 days _____sec__ 118
Erichsen-depression (DIN 53,156) _____mm__ 7.7

The films are resistant to solvents such as xylene, toluene, butyl acetate or ethyl acetate. The films are unchanged after a treatment for about 21 days with about 10% aqueous KOH or about 10% sulphuric acid at about 80° C.

EXAMPLE 3

*Production of the starting material*

(a) About 150 parts of xylene, about 150 parts of ethyl glycol diacetate and about 5 parts of lauroyl peroxide are heated under nitrogen to about 120° C. and a mixture of about 45 parts of ethylene glycol methacrylate, about 45 parts of butyl acrylate and about 100 parts of styrene is slowly added thereto.

(b) The starting material, obtained after completing polymerization, is reacted in the manner described in Example 2 with a polyisocyanate. After brushing onto a support, films are obtained which are characterized by good resistance to alkalis.

Since the foregoing working examples are given for the purpose of illustration, it is to be understood that any other suitable sulfur-free copolymer, organic polyisocyanate, peroxide catalyst, molecular weight regulator, inert organic solvent, or the like could have been used therein provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyurethane coating composition which comprises an inert organic solvent solution of the reaction product prepared by a process which comprises reacting an organic polyisocyanate with a sulphur free copolymer prepared from a member selected from the group consisting of hydroxy alkyl acrylate and methacrylate, said alkyl group containing 2 to 12 carbon atoms, with a vinyl benzene and a member selected from the group consisting of alkyl acrylate and alkyl methacrylate wherein the alkyl group has from 1 to 12 carbon atoms, said copolymer having from 0.1 to 10% by weight of free hydroxyl groups and having been prepared in the presence of a sulphur free molecular weight regulator.

2. The polyurethane coating composition of claim 1 wherein said inert organic solvent is ethylene glycol diacetate.

3. The polyurethane coating composition of claim 1 wherein said copolymer is prepared by heating the recited components at a temperature in the range of from 50 to 150° C. in the presence of a free radical forming catalyst of the peroxide type until a copolymer having a molecular weight of from about 5,000 to about 100,000 is obtained which has an hydroxyl content within the range of from about 0.1% to about 10% by weight.

4. A polyurethane coating composition which comprises an ethyl glycol acetate solution of the reaction product of:
 (a) one mol of trimethylol propane with three mols of toluylene diisocyanate and
 (b) the sulfur-free reaction product of styrene, hydroxy propyl methacrylate and butyl acrylate in such proportions that the said sulfur-free copolymer contains from about 2 to about 10% by weight of free hydroxyl groups.

References Cited by the Examiner
UNITED STATES PATENTS

| | | | |
|---|---|---|---|
| 3,028,367 | 4/1962 | O'Brien | 260—77.5 |
| 3,036,045 | 5/1962 | Short et al. | 260—77.5 |
| 3,115,479 | 12/1963 | Windemuth et al. | 260—31.6 |

MORRIS LIEBMAN, *Primary Examiner.*